(12) United States Patent
Pieri

(10) Patent No.: US 6,412,518 B1
(45) Date of Patent: Jul. 2, 2002

(54) APPARATUS FOR OFF-LOADING INCOHERENT MATERIAL FROM A CONTAINER

(75) Inventor: Luciano Pieri, Arancio (IT)

(73) Assignee: Zanchetta & C. S.r.L., Montecarlo (IT)

( * ) Notice: Subject to any disclaimer, the term of this patent is extended or adjusted under 35 U.S.C. 154(b) by 0 days.

(21) Appl. No.: 09/458,232

(22) Filed: Dec. 9, 1999

(30) Foreign Application Priority Data

Mar. 29, 1999 (IT) ........................................ BO99A0148

(51) Int. Cl.⁷ ................................................ F16L 29/00
(52) U.S. Cl. .................................................. 137/614.01
(58) Field of Search ............................ 137/614, 614.01, 137/614.02

(56) References Cited

U.S. PATENT DOCUMENTS 3,106,223 A * 10/1963 Cooper .................. 137/614.01
5,884,660 A * 3/1999 Cathrein et al. ........ 137/614.01

FOREIGN PATENT DOCUMENTS

| DE | 44 15 488 | 12/1995 |
| EP | 547861 | 6/1993 |
| EP | 810170 | 12/1997 |
| WO | WO98/43902 | 10/1998 |
| WO | WO98/46505 | 10/1998 |

* cited by examiner

Primary Examiner—Kevin Lee
(74) Attorney, Agent, or Firm—Fay, Sharpe, Fagan, Minnich & McKee, LLP

(57) ABSTRACT

Apparatus for dispensing incoherent material from a container to an underlying user unit, comprising a conduit whose superior extremity can be placed in communication with an outlet of the container by means of a valve element comprising a shutter provided with a disk-shaped element and a screen associated to the disk-shaped element in a releasable manner by means of a plurality of permanent magnets positioned on the disk-shaped element and a plurality of magnets positioned on the screen and facing the magnets.

31 Claims, 11 Drawing Sheets

APPARATUS FOR OFF-LOADING INCOHERENT MATERIAL FROM A CONTAINER

BACKGROUND OF THE INVENTION

The present invention relates to an apparatus for off-loading incoherent material from a container.

The subject apparatus is usable, in particular, in the chemical and/or pharmaceutical industry and wherever containers housing in their interior incoherent material constituted by dusts, fine-grain granulates or similar products need to be off-loaded.

Such containers are emptied in correspondence with an off-loading station, wherefrom the material housed therein is transferred towards a collecting tank or a collector connected, for instance, to a machine that uses the incoherent material itself for subsequent work processes. The collecting tank is positioned at a given level, and it is sustained by a support structure able to allow the positioning of a container at another level, higher than the previous one, thereby allowing the emptying of the container itself by gravity.

To allow the material to flow out of the superior container into the inferior container, connecting means are provided between the two levels, usually constituted by a rigid cylindrical conduit positioned vertically, within which a tubular sack is usually coaxially inserted, such sack presenting its own extremities respectively connected, in a direct or indirect manner, to the discharge outlet of the container and to the loading outlet of the tank or hopper.

The container is emptied by the passage of the dust contained therein through the tubular sack, which must be connected in substantially hermetic manner to the container and to the hopper so as not to let the dust exit: in practice, the dispersion of the dusts into the environment needs to be contained as much as possible. The relevance of the problem described above is all the greater the more the dusts treated in the apparatus considered above are constituted by substances or chemical compounds which are not easily degradable in the environment and, in some case, potentially harmful.

For this reason it is necessary to use tubular sacks that differ from substance to substance and thoroughly to clean the connection when shifting from one substance to another. Usually, the superior extremity of the aforesaid cylindrical conduit is connected to the aforementioned container through a spacer element provided with an inner cavity developing along a vertical axis; to an intermediate portion of said spacer element is coaxially connected in air-tight fashion the superior extremity of the aforementioned tubular sack.

The inferior extremity of the aforesaid container supports a valve element usable to open or to close completely the inferior extremity itself; such valve element is usually constituted by a butterfly valve equipped with a substantially disk-shaped shutter element able to rotate in the two directions about a horizontal axis. To the inferior extremity of the aforementioned spacer element can be associated a removable shutter element, able completely to close, when present, the inferior extremity of the spacer element itself. Every time the incoherent material housed inside the container has completed flowing towards the collecting tank, and the apparatus in question needs to be used to handle a material differing from the one handled previously, all portions of the apparatus which have been in contact with the material must be perfectly cleaned, in correspondence with an appropriate washing station, to prevent any contamination of the new material to be handled.

For this purpose, in the first place, the aforementioned butterfly valve must be closed, the tubular sack must be removed, preferably after making it re-enter, in a way known in itself, into the aforesaid spacer element, and the shutter element must be so positioned as to close the inferior extremity of the spacer element itself. The aforementioned container and the spacer element are then removed to be taken to the washing station.

All the operations described above should take place, as mentioned, without the possibility of any pollution to the surrounding environment by residues of material present inside the container, the spacer element and the tubular sack. However, in reality, the face of the shutter element of the butterfly valve opposite the one defining the bottom of the container is soiled with material, which can easily be transferred to the environment while the container itself is being removed, and the superior extremity of the spacer element, also soiled, is open.

SUMMARY OF THE INVENTION

The aim of the present invention is to eliminate the aforementioned drawback, providing an apparatus for off-loading incoherent material from a container wherein the various aforementioned components can be removed from the apparatus itself without there being the possibility of any discharge of material, preventing cross-pollination between the aforementioned components and the external environment.

According to the present invention, an apparatus is obtained for off-loading incoherent material from a container, for the dispensing of the incoherent material itself along a determined feeding route and towards a user unit, comprising a valve organ positioned in correspondence with an outlet of said container and a conduit whose axis of development is parallel to said route, whose first extremity can be associated to said valve organ and separated therefrom and whose second extremity can be put in communication with said user unit; said valve organ comprising shutter means, movable between an extreme hermetic closure position and an open position of the outflow port of said feeding conduit, and provided with a first closure element and with a second closure element; said valve organ further comprising connecting means able to associate mutually and in a releasable manner said first closure element and second closure element making them mutually adherent, at least partially, along a plane of mutual substantial tangency and of mutual detachment.

BRIEF DESCRIPTION OF THE DRAWINGS

The invention shall now be described with reference to the accompanying drawings, which represent an embodiment provided purely by way of non-limiting example, wherein.

DESCRIPTION OF THE PREFERRED EMBODIMENTS

Figure 1:
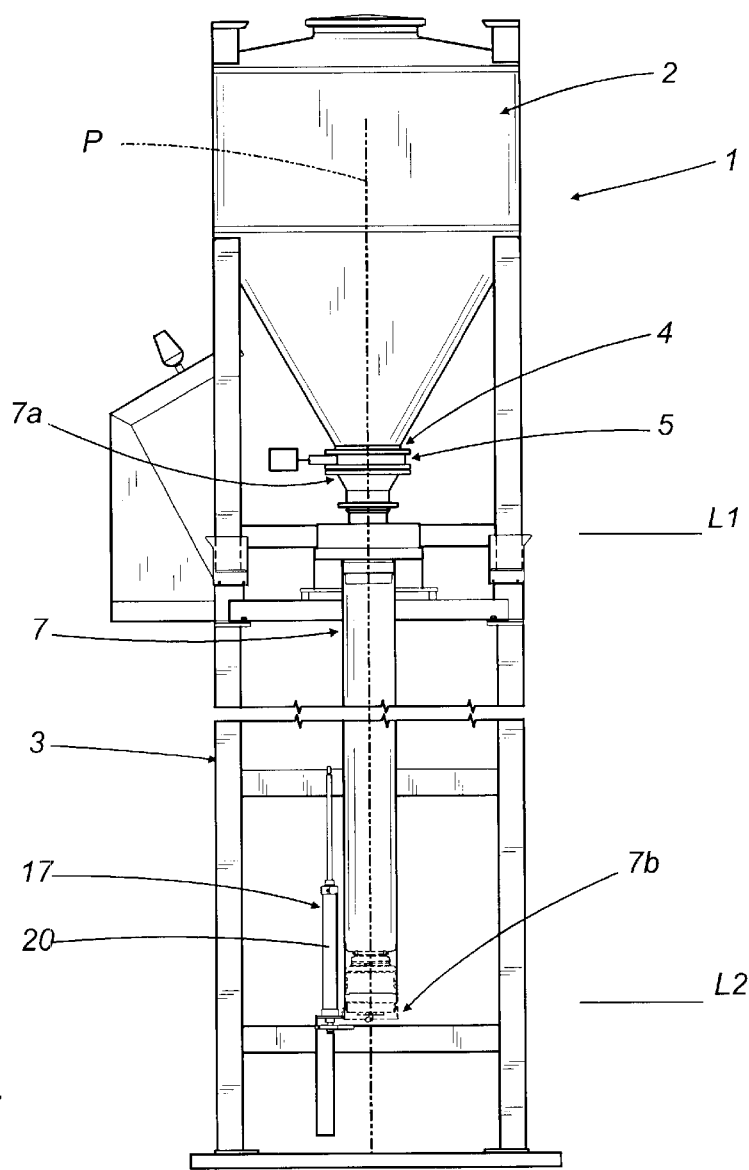
FIG. 1 schematically shows, in an overall front view, an embodiment of an apparatus in accordance with the present invention.

With reference to FIG. 1, the number 1 indicates in its entirety an apparatus for off-loading incoherent material from a container 2 and along a determined route P.

In the illustrated embodiment, the apparatus 1 comprises a structure 3 positioned substantially vertical, schematically shown in FIG. 1 and presenting a first upper level L1 and a second lower level L2.

This structure 3 simulates, in practice, a difference in height between the two levels, and the structure 3 is meant to represent schematically all those situations wherein a raized plane supporting a container 2 is present, along with a collecting tank (not shown) positioned at a lower plane.

In correspondence with the first level L1 the structure 3 comprises means for supporting the container 2, which container, in the illustrated embodiment, is constituted by a hopper positioned with its outlet 4 oriented downwards. A valve organ, which can essentially be constituted by a valve provided with a respective shutter organ, of the butterfly or mushroom type, whose characteristics shall be clarified in detail hereafter, with reference in particular to FIGS. 2, 3, 14, 15, 16, 17, 18, 19, 20, 21 and 22, is associated to the container 2, in proximity to its outlet 4, and is usable, as shall become readily apparent hereafter, to open or close the outlet 4 itself in order to allow or, respectively, prevent the exit of the incoherent material from the container 2 itself.

Figure 13:
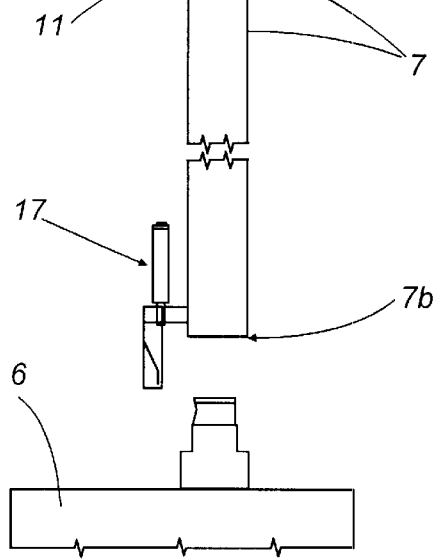

On the second lower level L2 are provided means (not shown) for connecting to a user unit, schematically illustrated in the form of a block 6 in FIG. 13, whose entry portion is constituted, for instance, by a tank or by a hopper, not shown herein.

Figure 2:
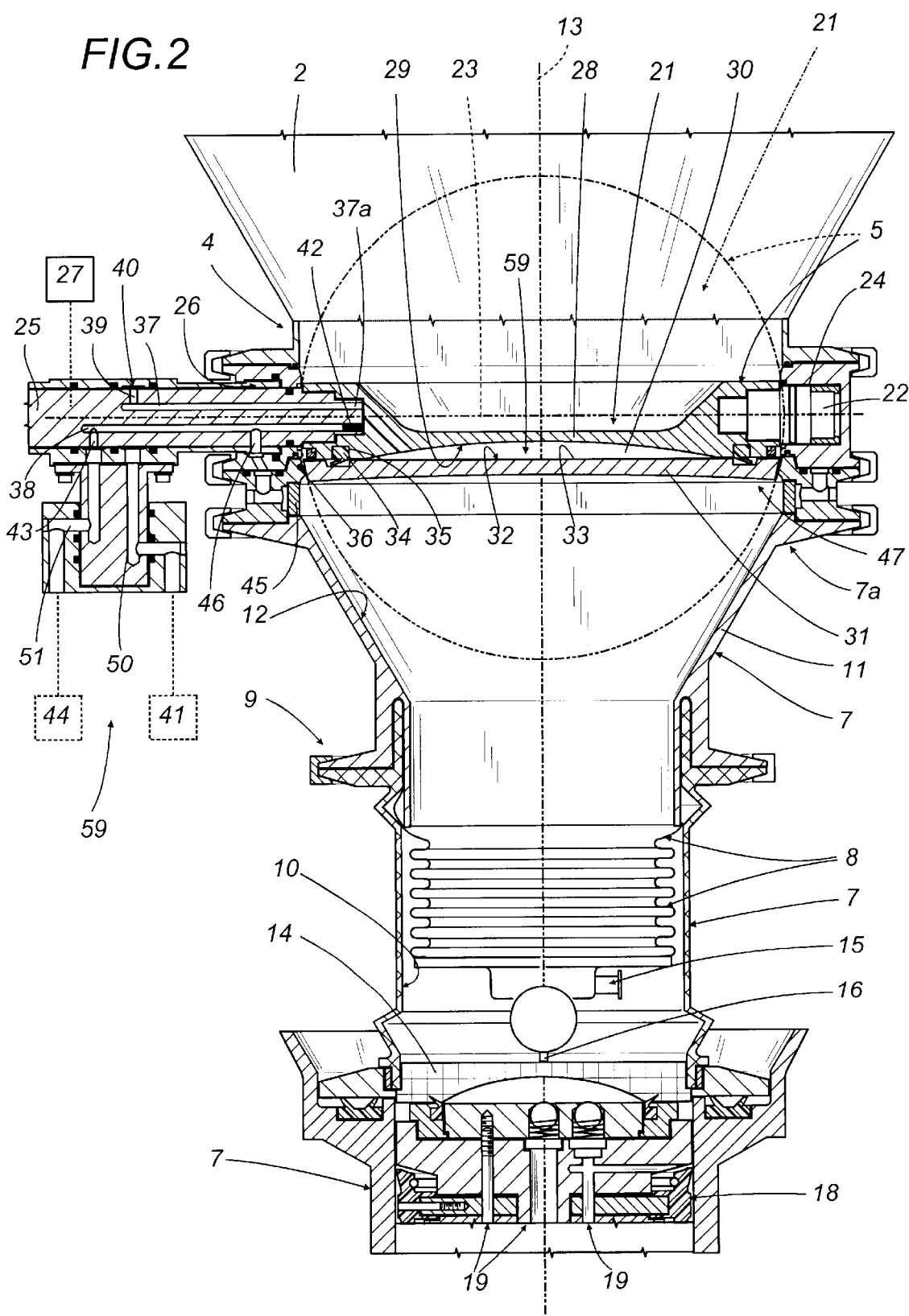
FIG. 2 shows a section view of a portion of the apparatus of FIG. 1 provided with a valve organ realized according to an embodiment.

The first level L1 and the second level L2 are mutually connected by means of a conduit 7, mechanically resistant and destined to contain, as illustrated in particular in FIG. 2, a floppy tubular sack 8 defining a transit channel for transferring the material from the container 2 to the aforementioned user unit 6. As shown in FIG. 2, the apparatus 1 is provided with a tubular container 9 defining a chamber 10 for containing the tubular sack 8 in the resting position and folded and collected along its longitudinal axis. The container 9 comprises a spacer element 11 which defines the superior extremity 7a of the conduit 7 and able to connect the aforesaid extremity 7a of the conduit 7 itself to the outlet 4 of the container 2.

The spacer element 11 is provided with an inner cavity 12 developing along a vertical axis 13 coinciding with the axis of longitudinal development of the conduit 7, and to an intermediate portion of the spacer element 11 itself is coaxially connected in air tight fashion the superior extremity of the aforesaid tubular sack 8.

The inferior extremity of the tubular sack 8 is connected in a way known in itself to a junction flange or plug 14 able to be associated to the aforementioned means for connecting to the user unit 6. The flange 14 is shaped and/or presents such association means that, in a way known in itself, it is held in the inferior extremity portion of the containment chamber 10, or, according to an embodiment of the present invention not shown herein, in correspondence with the final outlet of the container 2. By way of example, the junction flange or plug 14 can be held by the realization of an interference insertion.

Also provided are means, not shown, for the reversible fastening of the tubular sack 8 to a superior portion of the junction flange or plug 14, as well as means 15 for closing the tubular sack 8 itself, positioned upstream of the reversible fastening means and able to be activated independently therefrom.

Moreover, a fastening band (not shown herein) can be provided, or another fastening element positioned on the free inferior extremity of the tubular sack 8 and tightened around the superior portion of the flange 14.

Between the free extremity of the tubular sack 8 and the container 2, a sort of string 16 for closing the tubular sack 8 itself is provided. In this way, the association and disassociation is allowed between the tubular sack 8 and the flange 14 in correspondence with an activation of the aforementioned closure means 15, i.e. in a condition wherein the tubular sack 8 itself is closed by the aforementioned closure string 16. Thanks to the closure means 15, also the operations of associating and disassociating the flange 14 with parts of the apparatus 1 positioned downstream can be performed with the tubular sack 8 closed, i.e. without any dispersion of the material present in the container into the environment.

As shown in FIGS. 4 through 13, means 17 are provided for the bidirectional translation of the junction flange or plug 14 from the upper level L1 to the lower level L2 through the conduit 7.

For a detailed description of said translator means and of the aforementioned container 9, as well as of some other details of the apparatus 1 named but not shown herein, reference is made to Italian Patent No. 1.285.728 and equivalent European publication EP-810.170 by the same Applicant, referenced in its entirety herein for the sake of completeness of description.

The aforementioned translator means 17 are suitable to make the tubular sack 8 move to an operative position and to transfer the flange or plug 14, once it has reached the lower level L2, towards an area set laterally side by side to the lower portion of the conduit 7, thereby enabling the connection between the tubular sack 8 itself and the aforementioned connecting means not shown herein. In other words, the flange 14 can be extracted from the conduit 7 to be associated to connecting organs or to machines positioned downstream of the apparatus 1.

As shown, in particular, in FIG. 2, the apparatus 1 comprises a plunger 18 able to slide inside the conduit 7. The plunger 18 presents its upper portion shaped substantially as a cup or suction cup, and the junction flange or plug 14 presents its lower portion shaped complementarily; in practice, this lower portion is inferiorly shaped in such a way as to provide a surface suitable for association with a suction cup. Between the plunger 18 and the flange 14 act means suitable to generate a depression, indicated as 19 in their entirety.

Such means 19 are constituted by a series of conduits through which the plunger 18 is connected to a source of vacuum (not shown herein), thereby obtaining a pressure union between the plunger 18 itself and the plug 14.

For the bidirectional displacement of the plunger 18 between the two levels L1 and L2, i.e. between the superior and inferior extremities of the conduit 7, the aforesaid translator means 17 are provided with a latching organ (not shown) for the plunger 18 (FIG. 1). The translator means 17 are able to position the latching organ between two limit positions: a first position corresponds to a positioning of the plunger 18 inside the conduit 7, in the inferior extremity thereof, whilst a second position is external to the conduit 7 and situated at a lower level relative to the first position.

In particular, as shown schematically in FIG. 1, the translator means 17 can be constituted by an actuating means comprising a pneumatic cylinder 20, acting on a bracket (not shown herein) supporting the aforementioned latching organ, not shown herein; the bracket in question is guided along a route defined by a depression along the axis 13 of longitudinal development of the conduit 7 and by a rotation about the same axis 13.

Figure 3:
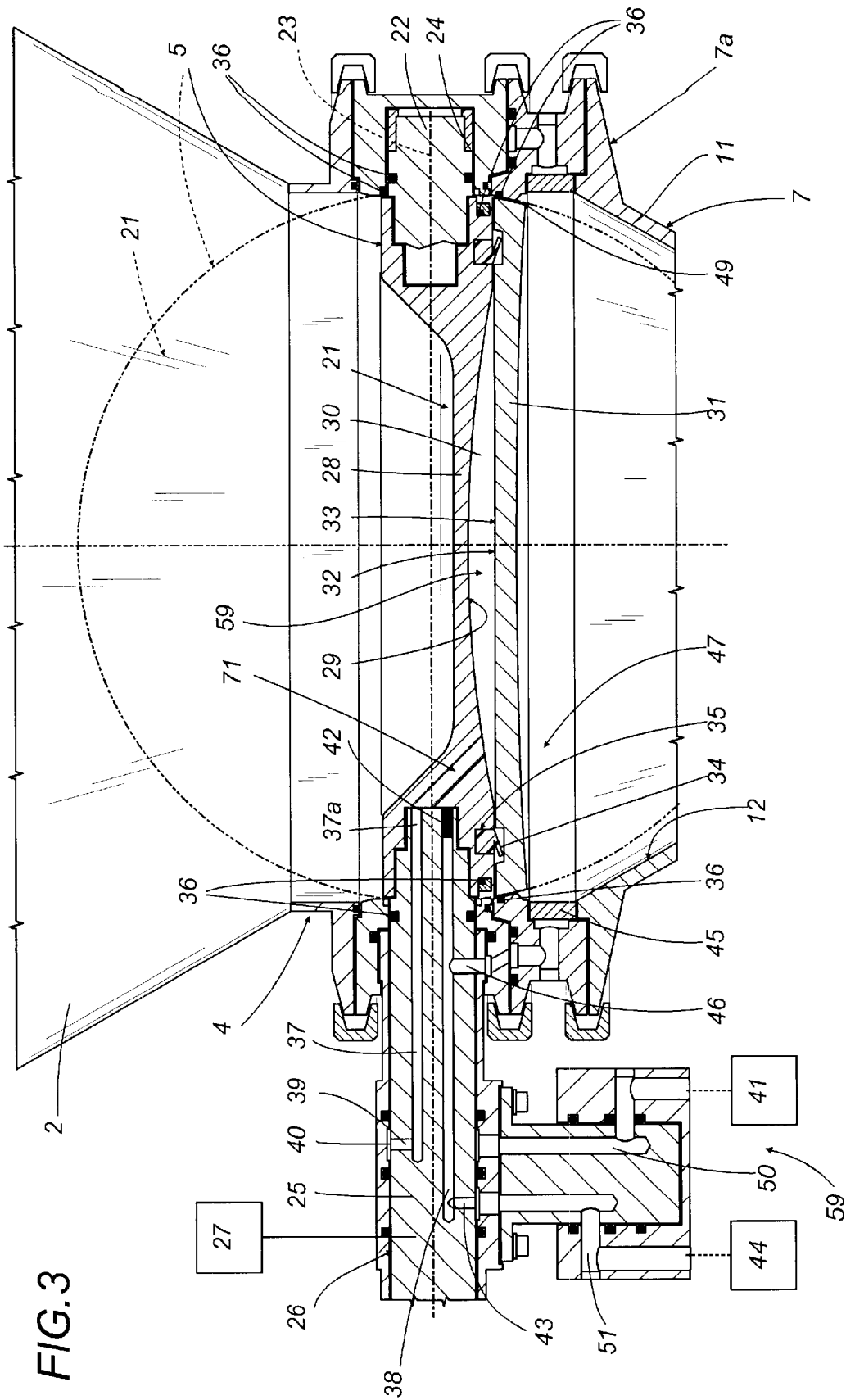
FIG. 3 shows, in enlarged scale, a section view of some details of FIG. 2.
Figure 4:
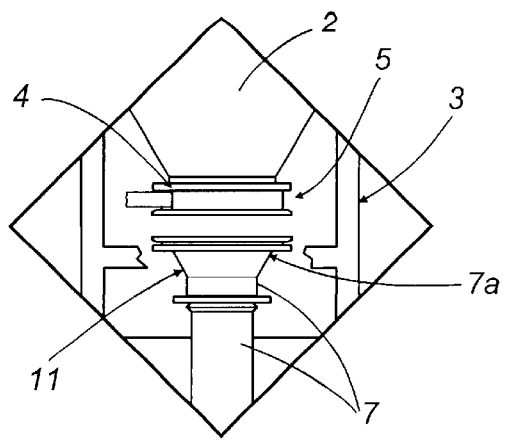
FIGS. 4 through 13 schematically show some details of the apparatus of the previous figures in different operative phases.

As shown in FIGS. 2, 3, 14, 15, 16, 17, 18, 19, 20, 23 and 25, the aforesaid valve 5 is provided with a butterfly shutter element 21 presenting substantially circular and flat shape, which is supported, in correspondence with its two diametrically opposite areas, respectively by a pivot pin 22, developing along a horizontal axis 23 parallel and offset with respect to a diameter of the shutter element 21 itself, positioned to the right in FIGS. 2 and 3 and fitted, pivotingly about the axis 23, within a seat 24 obtained in correspondence with a lower portion of the container 2, and by a shaft 25 developing along the aforementioned axis 23, positioned to the left and pivotingly supported about the axis 23 and by a further seat 26 obtained in correspondence with an additional inferior portion of the container 2 itself. The extremity of the shaft 25 opposite the one connected to the shutter element 21 is connected in a manner not shown herein to actuator means, which can be of any kind known in itself and are shown schematically in the form of a block 27 in FIGS. 2 and 3, able to produce, respectively for the opening and the closing of the valve 5, a rotation in the two directions of the shaft 25 itself about the axis 23 with an amplitude substantially equal to 90E.

The butterfly shutter element 21 comprises a first disk-shaped closure element 28 rigidly supporting, in correspondence with its two diametrically opposite areas, the aforementioned pivot pin 22 and, respectively, shaft 25, which project radially from the disk-shaped element 28 itself. The disk-shaped element 28 presents a diameter essentially equal to the diameter of the aforementioned outlet 4.

As shall become readily apparent hereafter, the aforementioned rotations in the two directions of the shaft 25 about the axis 23 entail corresponding rotations in the two directions of the disk-shaped element 28 about the axis 23 itself, between a closed position of the aforementioned outlet 4, wherein the disk-shaped element 28 lies on a substantially horizontal plane, and an open position wherein the disk-shaped element 28 itself lies on a substantially vertical plane, as shown in dashed lines in FIGS. 2, 3, 14, 15, 16 and 20.

Figure 14:
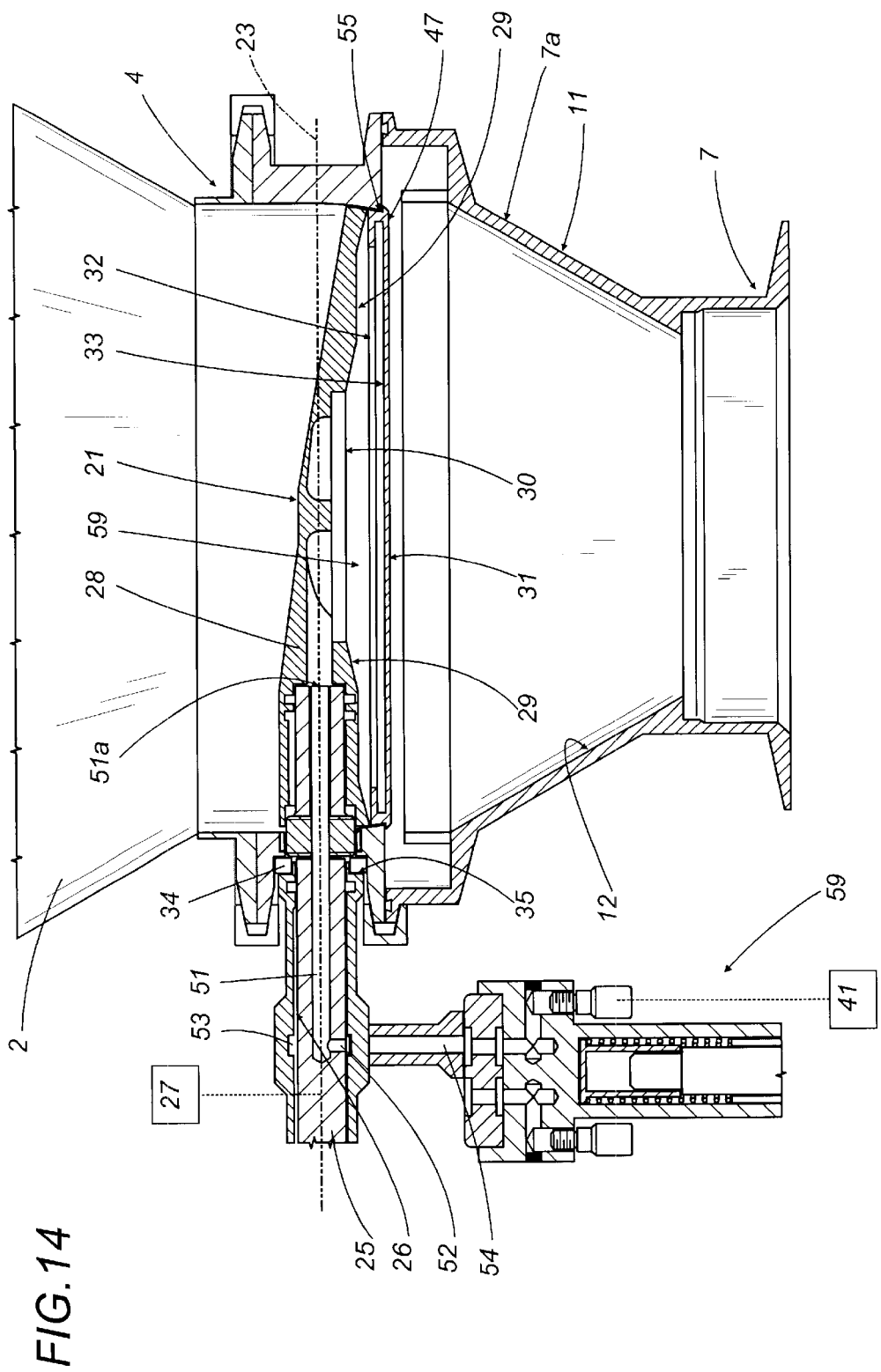
FIG. 14 shows a schematic section view of an alternative embodiment of the detail of FIG. 3.
Figure 15:
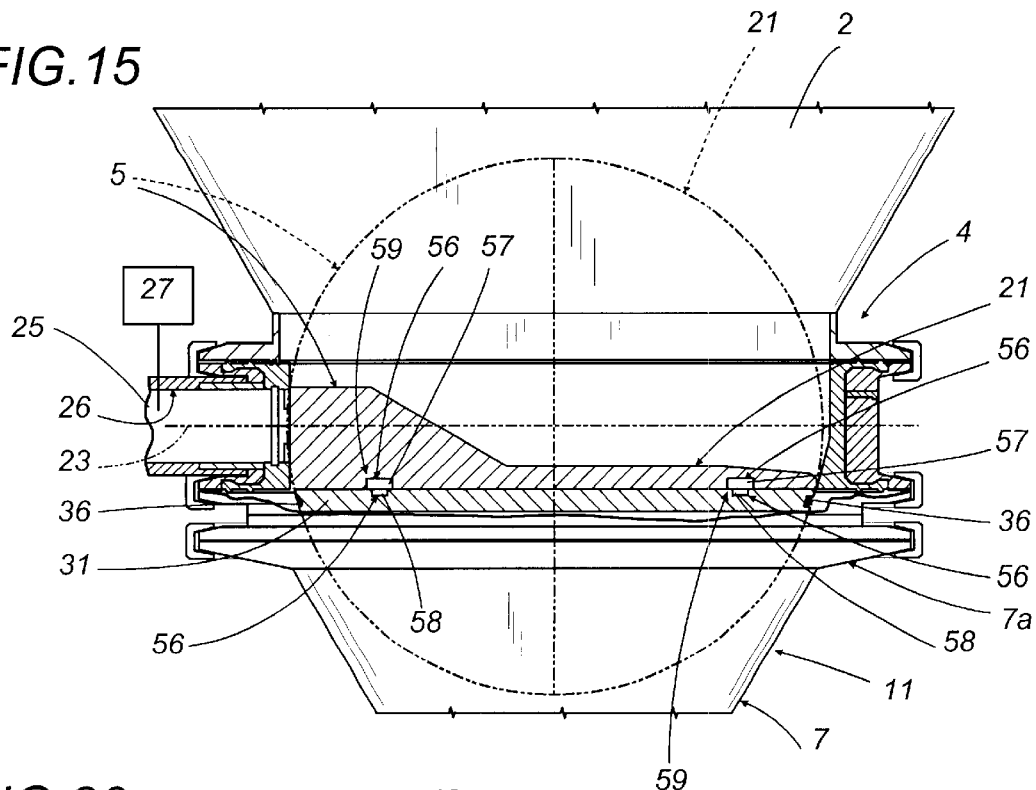
FIG. 15 shows a schematic section view of an alternative embodiment of the detail of FIG. 3.

As shown in FIGS. 2, 3 and 14, one of the two mutually opposite surfaces of greater extension of the disk-shaped element 28 (the one positioned inferiorly in FIGS. 2 and 3, indicated as 29) is provided with a cavity 30 substantially coaxial thereto and involving a central portion of the surface 29 itself.

The butterfly shutter element 21 further comprises a second closure element 31 constituted by a disk-shaped screen 31, presenting diameter substantially equal to that of the disk-shaped element 28 and to that of the inlet of the spacer element 11 and positioned, when the shutter element 21 is in condition of closure of the outlet 4 of the container 2, underneath the disk-shaped element 28 itself and approached thereto. In this situation, the disk-shaped element 28 and the underlying disk-shaped screen 31 border in correspondence with a horizontal plane 32, bordered both by a lower peripheral annular portion of the disk-shaped element 28, surrounding the aforementioned cavity 30, and by the upper surface 33 of the disk-shaped screen 31 itself.

A sealing ring 34 is housed within an annular slot 35 obtained coaxially in the lower surface of the disk-shaped element 28 and, in the situation considered above, borders an annular portion of the upper surface 33 of the disk-shaped screen 31. Additional sealing means generically indicated as 36 ensure that, in the aforementioned closure condition, the shutter element 21 obstructs in a substantially air tight manner the outlet 4 of the container 2 and the inlet of the conduit 7.

Figure 23:
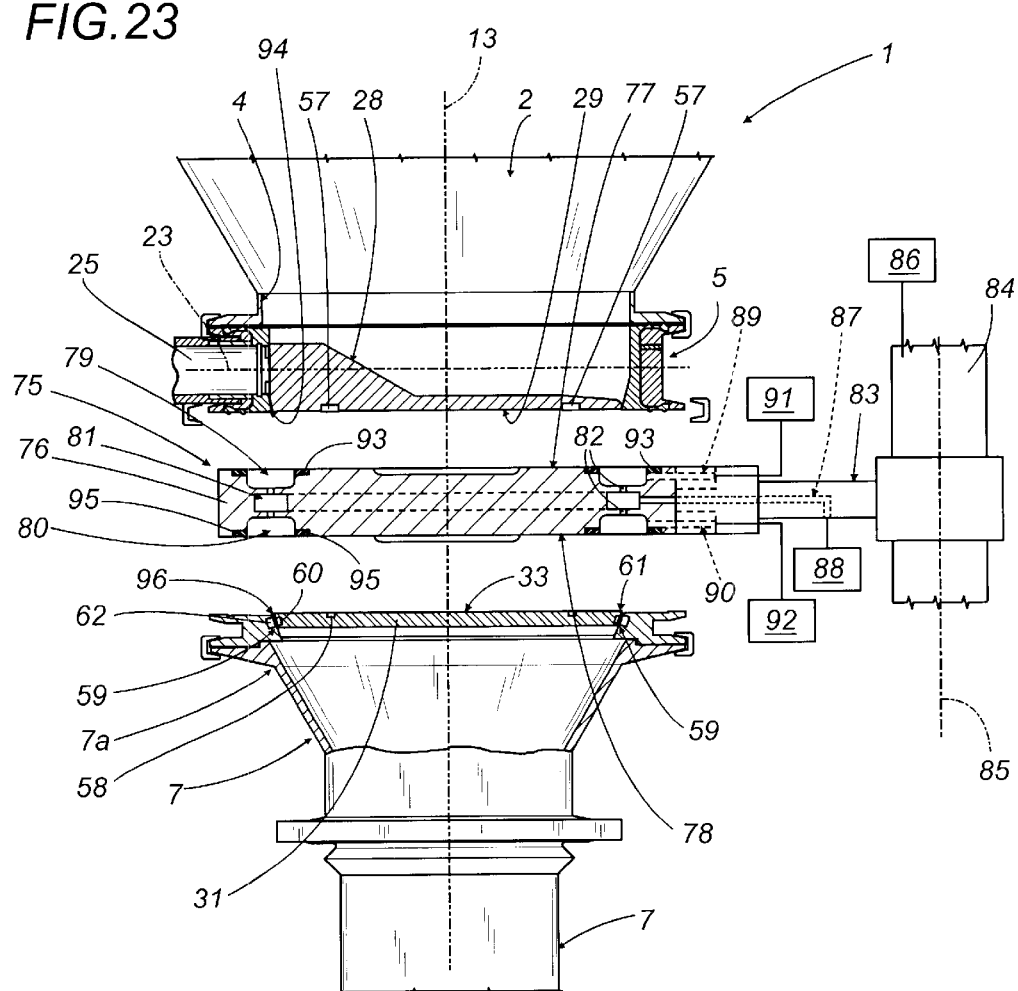
FIG. 23 schematically shows a section of a further embodiment of the valve organ.
Figure 25:
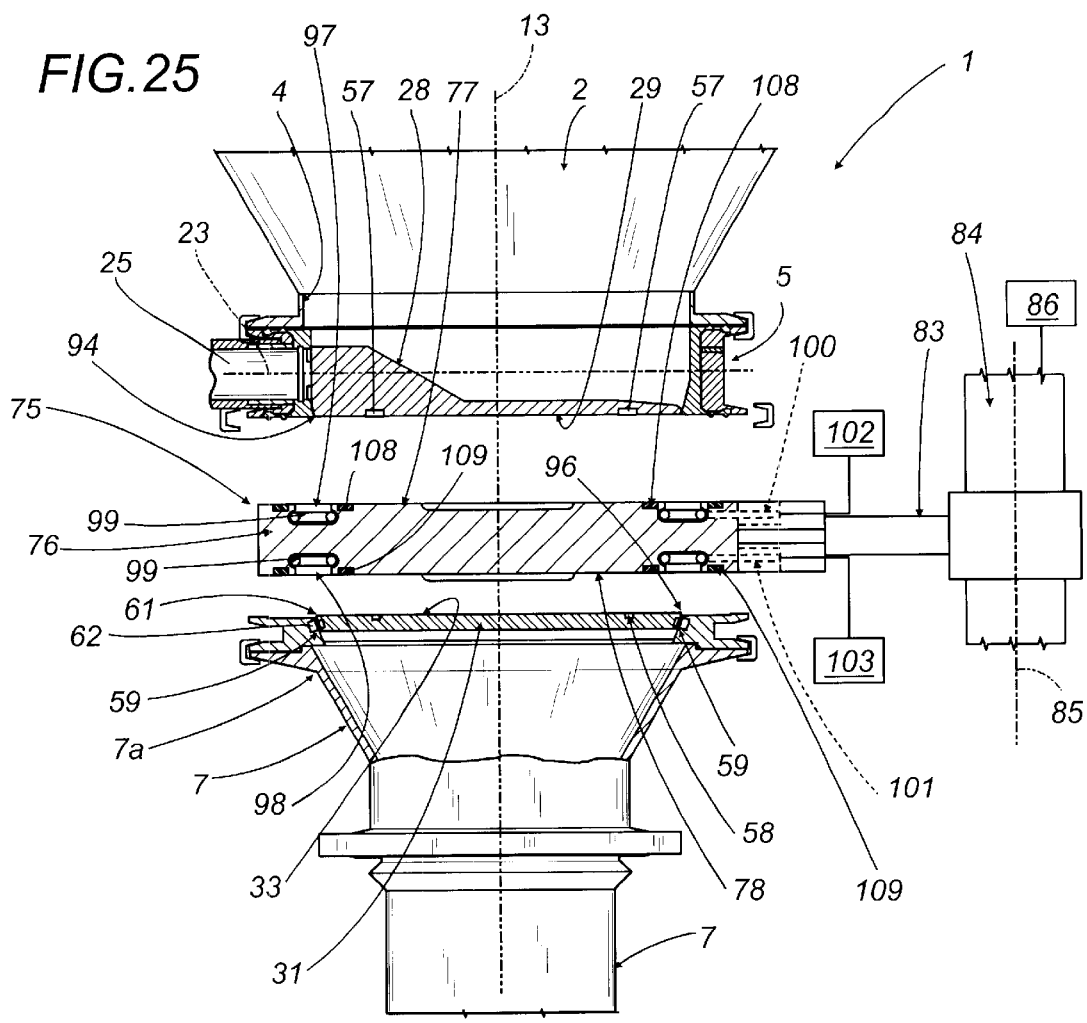
FIG. 25 shows a schematic section view of an alternative embodiment of the valve organ of FIG. 23.

As shown in FIGS. 2 and 3, and from 14 to 21 and in FIGS. 23 and 25, the valve organ 5 comprises connecting means, acting on the shutter organ 21 and indicated in their entirety as 59, which allow mutually to associate, in releasable manner, the aforementioned first closure element 28 and second closure element 31 in such a way as to make them mutually adherent, at least partially, along the aforesaid plane 32 of mutual substantial tangency and in such a way as to allow the mutual detachment of the first and second closure element 28, 31 along the same plane 32.

Figure 18:
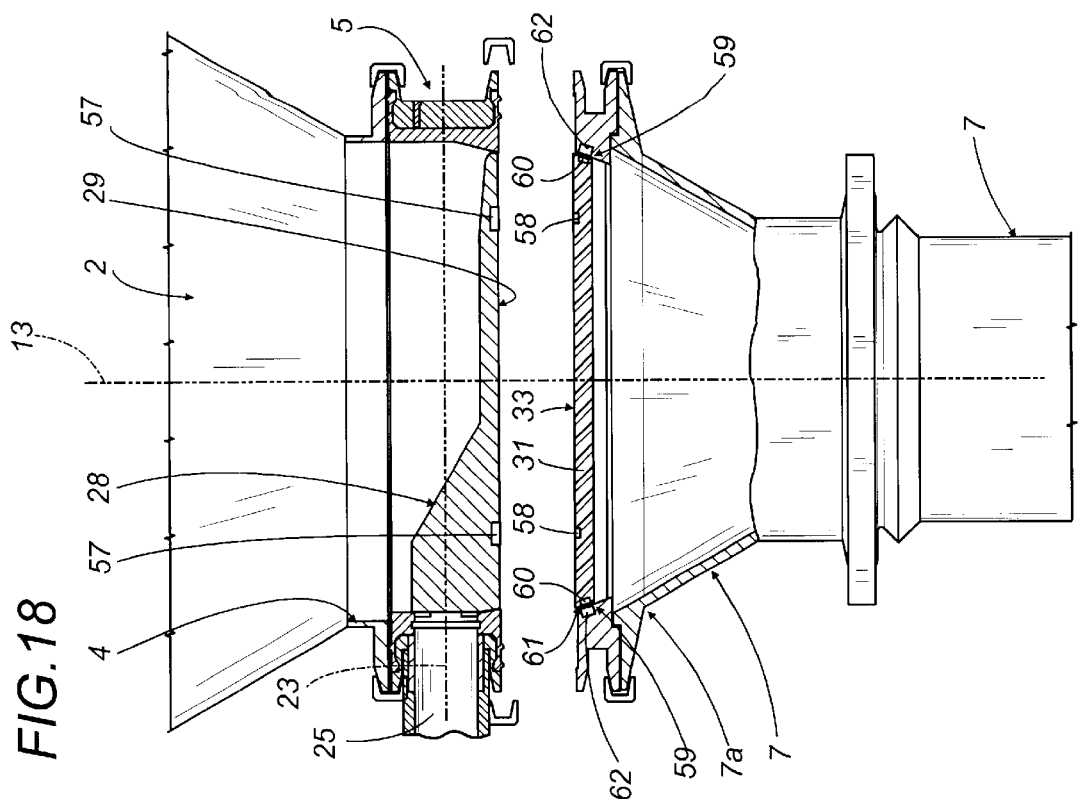
Figure 16:
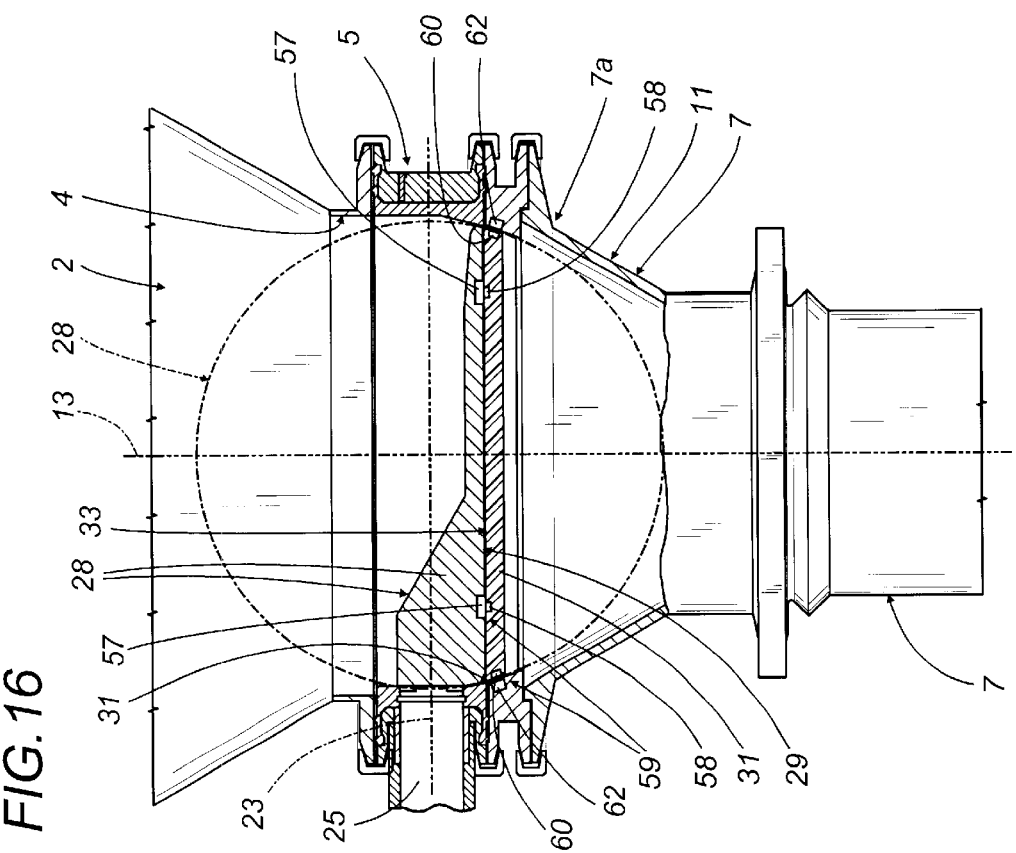

In particular, the aforesaid connecting means 59 allow to maintain mutually associated the first and second closure element 28, 31 during the actuation of the shutter organ 21, between an extreme air-tight closure position and an extreme position of opening the outflow port of said feeding conduit 7, during the aforesaid rotation in the two directions of the shaft 25 about the axis 23 with amplitude substantially equal to 90E, as shown in FIGS. 2, 3, 14, 15, 16, 18 and 20, whereas they allow a mutual detachment of the same first and second closure element 28, 31 during the separation of the first extremity 7a of the conduit 7 from the valve organ 5 as shown in FIG. 18. In this way the first closure element 28 is positioned to close the outlet 4 of the container 2 and the second closure element 31 is positioned to close the first extremity 7a of the conduit 7.

As shown in FIGS. 2, 3 and 14, the aforementioned connecting means 59 are of the pneumatic type and allow to reduce the pressure of the air housed within said cavity 30 below atmospheric pressure and thus to determine a consequent stable mutual adhesion of the first and second closure element 28, 31.

To this end the shaft 25 is internally traversed, in correspondence with is portion proximate to the disk-shaped element 28, by two blind holes 37 and 38 parallel to the longitudinal axis 23 of the shaft 25 itself, which present the respective open extremities positioned on the extremity of the shaft 25 connected to the disk-shaped element 28. An extremity 37a of the hole 37 ends inside the disk-shaped element 28 by means of a through hole 71 and communicates with the surface 29 defining the aforementioned cavity 30, whilst the other extremity portion of the hole 37 communicates, by means of a radial hole 39 obtained in the shaft 25 and an annular throat 40 obtained internally to the seat 26, with a source of suction schematically shown in the form of a block 41 and connected to the aforementioned throat 40 by means of a conduit 50. The extremity of the hole 38 positioned in correspondence with the extremity of the shaft 25 connected to the disk-shaped element 28 is closed by a plug element 42, whilst the other extremity portion of the hole 38 communicates, through a radial hole 43 obtained in the shaft 25, with a source of vacuum shown schematically in the form of a block 44 and connected to the aforementioned hole 43 by means of a conduit 51.

A median portion of the hole 38 communicates with the internal cavity 12 of the spacer element 11, with the interposition of a filter 45, through a radial hole 46 obtained in the pin 25 and ending in correspondence with an upper portion of the internal cavity 12 itself.

In the embodiment illustrated in FIG. 14, the aforementioned disk-shaped element 28 is supported in overhang only by the shaft 25 which is internally traversed, in correspondence with its portion proximate to the disk-shaped element 28, by a blind hole 51 parallel to the longitudinal axis 23 of the shaft 25 itself, which presents the respective open extremity positioned on the extremity of the shaft 25 connected to the disk-shaped element 28.

An extremity 51a of the hole 51 ends inside the disk-shaped element 28 and communicates with the surface 29 defining the aforementioned cavity 30, whilst the other extremity portion of the hole 51 communicates, through a radial hole 52 obtained in the shaft 25 and an annular throat 53 obtained internally to the seat 26, with a suction source shown schematically in the form of a block 41 and connected to the aforementioned throat 53 by means of a conduit 54.

As in the other embodiments shown in FIGS. 2 and 3, also in the embodiment illustrated in FIG. 14 the shutter element 21 comprises a disk-shaped screen 31, presenting diameter substantially equal to that of the disk-shaped element 28 and to that of the inlet of the spacer element 11 and positioned, when the shutter element 21 is in the condition wherein it closes the outlet 4 of the container 2, underneath the disk-shaped element 28 itself and approached thereto. In this situation, the disk-shaped element 28 and the underlying disk-shaped screen 31 border each other in correspondence with a horizontal plane 32, bordered both by a lower peripheral annular portion of the disk-shaped element 28, surrounding the aforementioned cavity 30, and by the upper surface 33 of the disk-shaped screen 31 itself.

According to the embodiments shown in FIGS. 15, 16, 17, 18 and 19 the aforesaid connecting means 59 are magnetic and the aforementioned disk-shaped element 28 is sustained in overhang only by the shaft 25. Similarly to the other embodiments shown in FIGS. 2, 3 and 14, the shutter element 21 comprises a first and second closure element 28, 31 constituted by a disk-shaped element 28 and a disk-shaped screen 31, presenting substantially equal diameter to that of the disk-shaped element 28 itself and to that of the inlet of the spacer element 11 and positioned, when the shutter element 21 is in the condition wherein it closes the outlet 4 of the container 2, underneath the disk-shaped element 28 itself and approached thereto. In this situation, the disk-shaped element 28 and the underlying disk-shaped screen 31 border each other in correspondence with a horizontal plane 32, bordered both by a lower peripheral annular portion of the disk-shaped element 28, and by the upper surface 33 of the disk-shaped 31 itself. In particular, according to the embodiment illustrated in FIG. 15, the disk-shaped screen 31 is held to the aforementioned disk-shaped element 28 by means of a plurality of magnetic devices 56 comprising a plurality of first permanent magnets 57 positioned along a circumference of the disk-shaped element 28 in correspondence with its lower surface 29 facing the upper surface 33 of the disk-shaped screen 31. Similarly, on the upper surface 33 of the disk-shaped screen 31 a plurality of second permanent magnets 58 are provided, facing the aforementioned first permanent magnets 57 and positioned along a circumference of the screen 31 whose diameter is substantially equal to that of the circumference of the disk-shaped element 28 along which the magnets 57 are positioned. The attraction between the magnets 57 and 58 allows to keep the screen 31 attached to the disk-shaped element 28 with the possibility of detaching it.

According to the embodiment illustrated in FIGS. 16, 17, 18 and 19 the aforesaid magnetic connection means 56 further comprise a plurality of third permanent magnets 60 positioned along a peripheral edge 61 of the screen 31 and a plurality of fourth permanent magnets 62 positioned along an inner peripheral edge 63 of the first extremity 7a of the conduit 7, obtained on the spacer element 11, and destined to be associated in a seal with the peripheral edge 61 of the closure screen 31, in such a way that the third magnets 60 face the fourth permanent magnets 62.

In use, the first and second permanent magnets 57, 58 generate a first determined resultant axial attraction force between the disk-shaped element 28 and the screen 31 and the third and fourth permanent magnets 60, 62 generate a second determined resulting lateral attraction force between the peripheral edge 61 of the screen 31 and the inner peripheral edge 63 of the first extremity 7a of the conduit 7.

Figure 19:
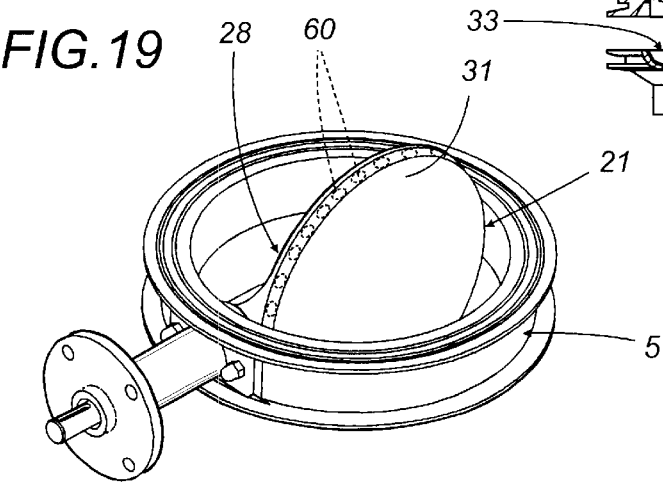
FIG. 19 shows a schematic perspective view of the detail relating to the valve organ realized according to FIGS. 16, 17, 18.

In particular the aforementioned first and second resulting attraction force are mutually balanced so that, during the actuation of the shutter organ 21, as shown in FIG. 19, the first resultant axial attraction force is predominant relative to said second resultant lateral force, allowing to maintain mutually associated the disk-shaped element 28 and the screen 31, whilst during the separation of the first extremity 7a of the conduit 7 from the valve organ 5, as shown in FIG. 18, the second resultant lateral attraction force is predominant relative to said first resultant axial attraction force allowing screen 31 to be detached from the disk-shaped element 28 and to remain integral with the extremity 7a of the conduit 7, closing it hermetically.

Figure 17:
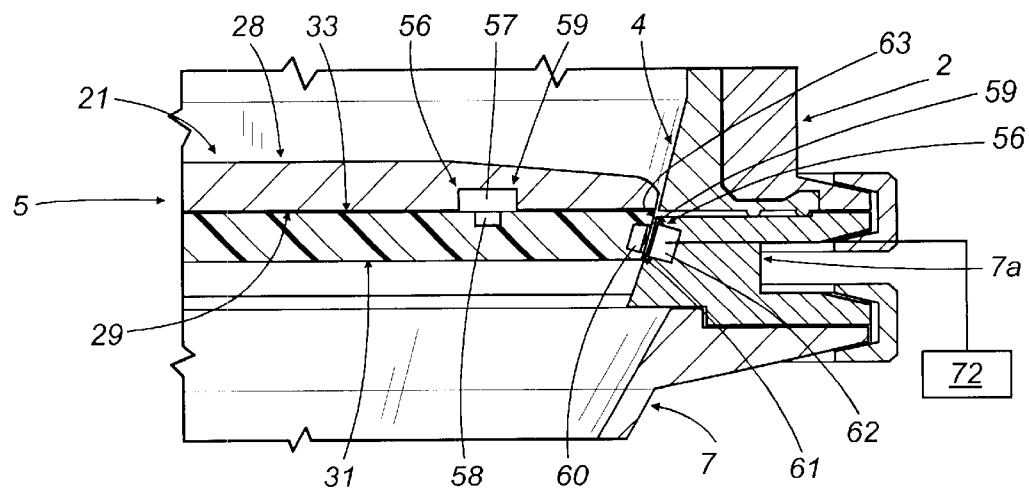
FIGS. 16, 17 and 18 show respective schematic section views, in different operative phases, of an additional preferred alternative embodiment of the detail of FIG. 15.

In order to balance properly the aforesaid first and second resultant axial and lateral force, according to the embodiment illustrated in FIG. 17, it may be provided for the fourth permanent magnets to be fitted with an electromagnet 72 which energizes and de-energizes the magnets 62 themselves, making the resultant lateral attraction force more or less intense according to the operative phases of the shutter organ 21.

The operation of the apparatus 1 shall now be described.

When utilization of the apparatus 1 starts, the container 2 is supported by an upper portion of the structure 3, with the disk-shaped element 28 positioned in the manner shown in FIGS. 2, 3 and 14 to obtain a perfect closure of the outlet 4 of the container 2 itself.

In this phase, the disk-shaped element 31 is separated from the disk-shaped element 28, and is not yet installed in the apparatus 1 since it will be utilized in a subsequent phase to the one currently being considered.

The spacer element 11 is separated from the remaining part of the apparatus 1.

A tubular sack 8 is introduced into the spacer element 11 in a configuration wherein the tubular sack 8 itself presents its lateral surface in a wrinkled condition and is vertically "compacted" and completely housed within the spacer element 11 itself. The upper extremity of the tubular sack 8 is connected in air tight fashion, in a way wholly known in itself, to the upper area of the spacer element 11, whilst the lower extremity of the tubular sack 8 itself is connected in a way known in itself to the plug 14 and the aforementioned closure means 15 of the tubular sack 8 and the closure string 16 are installed (for an exhausting description of these operations, see the aforementioned Italian Patent No. 1.285.728 and equivalent publication EP-810.170).

The disk-shaped screen 31 is then positioned in correspondence with the upper inlet 47 of the spacer element 11, in such a way that it co-operates with part of the aforesaid sealing means 36 to determine the substantially hermetic closure of the inlet 47 itself. In particular according to the embodiment illustrated in FIG. 14, the seal is assured by the circular peripheral edge 55 of the screen 31 which in its position shown with full lines in FIG. 14 provides a seal with the inner surface of the spacer element 11 in proximity with the aforementioned inlet 47.

Figure 5:
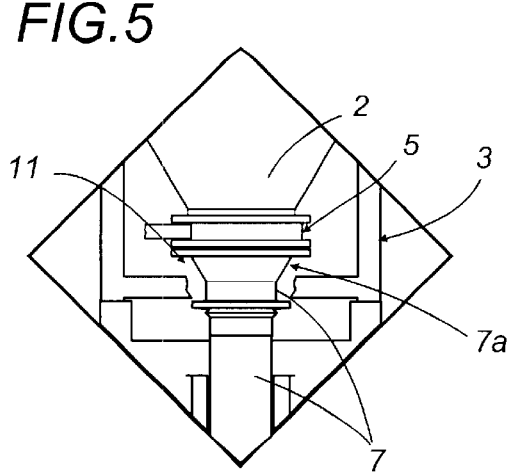
Figure 6:
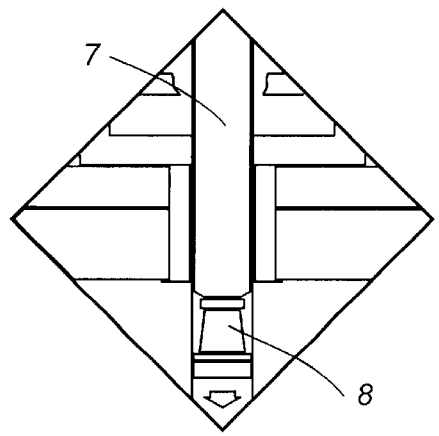
Figure 7:
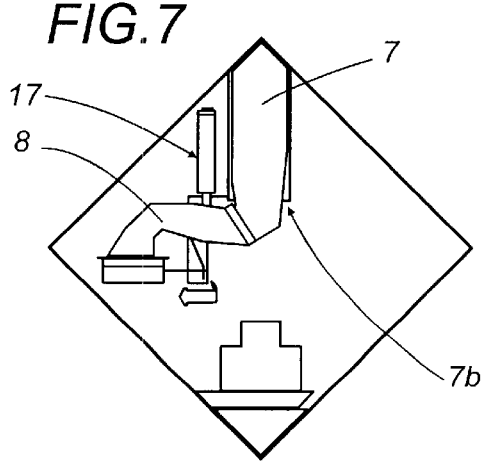
Figure 8:
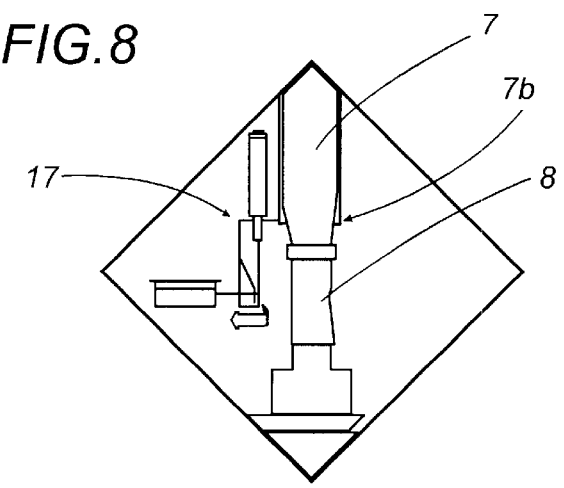
Figure 9:
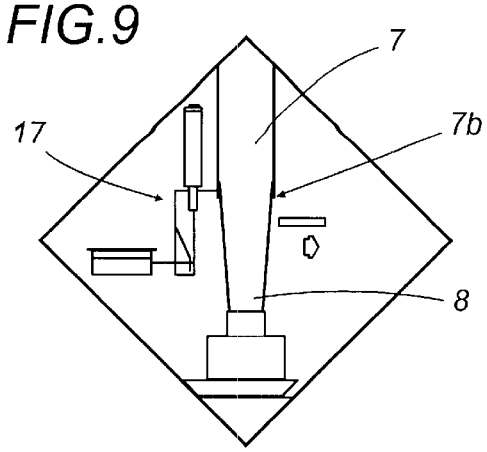

The spacer element 11 is then connected, in a manner known in itself, to the outlet 4 of the container 2 (FIG. 4), and the container 2, together with the spacer element 11, is moved to the position of FIG. 5 (see also FIG. 2), wherein a bottom portion of the spacer element 11 is connected to the upper extremity of the conduit 7 and the plug 14, under the action of the means 19, is made integral to the plunger 18 housed within the upper portion of the conduit 7.

In this situation, the suction source 41 is activated, and the pressure of the air present inside the cavity 30 of the disk-shaped element 28 is lowered below atmospheric pressure. As a consequence thereof, the disk-shaped screen 31 is attracted by the disk-shaped element 28 and solidly adheres to the disk-shaped element 28 itself, substantially constituting a single body therewith. Therefore, the suction source 41, the hole 37 and the cavity 30 shall all together be defined, hereafter, as "means for the mutual coaxial connection" of the disk-shaped element 28 and of the disk-shaped screen 31, since they are able to connect in releasable fashion the disk-shaped element 28 and the disk-shaped screen 31 themselves making them mutually adherent, at least partially, along the plane 32 of substantial mutual tangency.

The shutter element 21 of the butterfly valve 5, comprising the complex constituted by the disk-shaped element 28 and by the disk-shaped screen 31 solidly fastened to each other, is then taken to its open condition, and the plunger 18 is then progressively driven, by the aforementioned translator means 17, between the upper area of the conduit 7 and the means for connection to the user unit 6 (FIG. 6); as a result of this movement, the incoherent material set down within the container 2 starts descending into the tubular sack 8 and progressively to fill it.

When the plug 14 reaches the level L2, the translator means 17, in a way wholly known in itself, cause a translation of the plug 14 itself towards and area set laterally side by side to the lower portion of the conduit 7 (FIG. 7), thereby allowing the removal of the plunger 18 and of the plug 14 and the subsequent connection (FIG. 8) between the lower extremity of the tubular sack 8 and the aforementioned connecting means. This connection is effected after releasing the aforementioned reversible means for fastening the tubular sack 8 to the upper portion of the plug 14; once the connection is effected, the aforementioned band (not shown herein) and the aforementioned closure string 16 are released (FIG. 9), and the incoherent material housed within the tubular sack 8, also as a result of the opening of a valve element (not shown herein) positioned along the aforementioned means for connecting to the user unit 6, starts to flow towards the user unit 6 itself.

Figure 10:
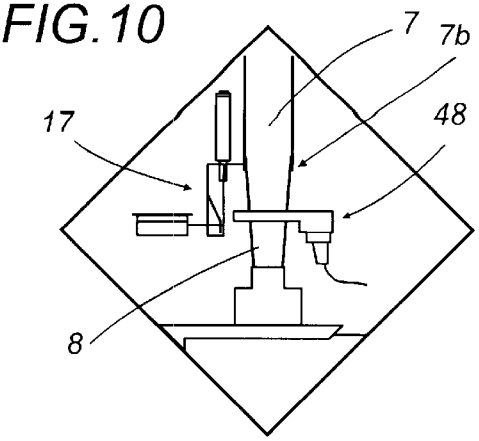
Figure 11:
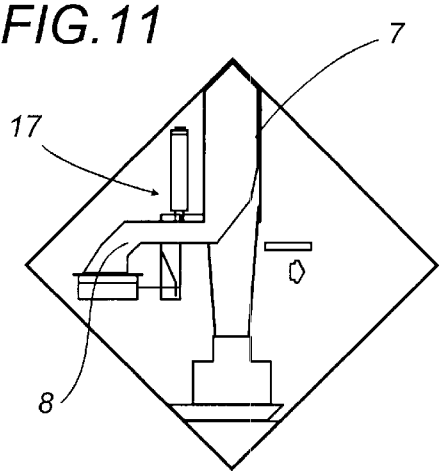

When all the incoherent material present within the container 2 has reached the user unit 6, and the tubular sack 8 has emptied completely, a binding device 48 of a type known in itself is activated to close by binding, and simultaneously cut off, the lower area of the tubular sack 8 itself (FIG. 10).

Figure 12:
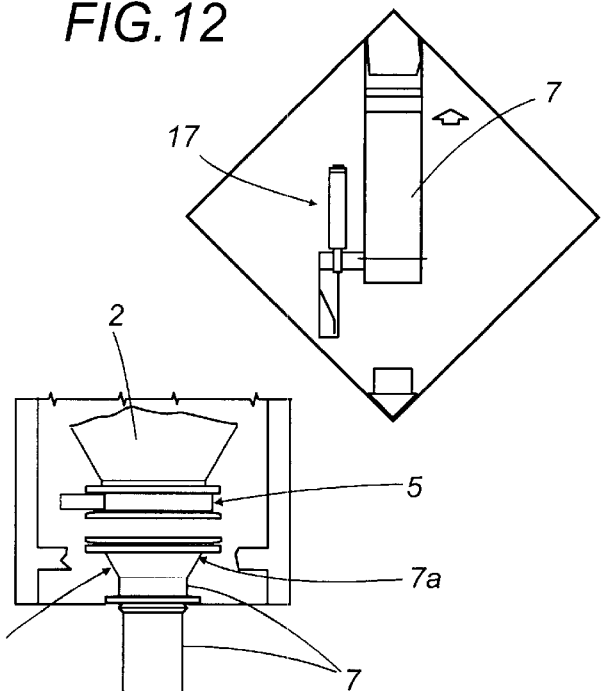

The lower extremity of the tubular sack 8 is then connected to the plug 14 (FIG. 11), and the plunger 18, as shown schematically in FIG. 12, is driven progressively upwards, by the aforementioned translator means 17, in such a way as to move the plug 14 itself between the lower area of the conduit 7 and the overlying level occupied in the previous operative phase described with reference to FIG. 5; at the end of this movement the tubular sack 8 presents its lateral surface wrinkled and is vertically "compacted" and completely housed within the spacer element 11.

Note that, preferably at the end of the upward drive of the plunger 18, the suction source 44 is activated, with consequent suction and removal, through the filter 45, of a considerable portion of the air contained within the tubular sack 8 housed inside the spacer element 11; this fact causes a more effective compacting of the tubular sack 8, without thereby giving rise to the insertion into the environment of the traces of incoherent material remaining in the tubular sack 8 itself after the emptying of the container 2.

The shutter element 21 of the butterfly valve 5, in an instant chosen appropriately and in any case subsequent to the one at which the container 2 was completely emptied, is taken to its closure position, and the suction source 41 is deactivated; thereupon, the disk-shaped screen 31 is no longer withheld by the disk-shaped element 28 and positions itself with its lower peripheral annular edge set against a corresponding annular surface 49 present in the inlet of the spacer element 11. Thanks to the presence of the aforementioned sealing means 36, the contact between the disk-shaped screen 31 and the annular surface 49 is substantially air tight.

The spacer element 11, housing in its interior the compacted tubular sack 8, is then removed from the apparatus (FIG. 13) and is taken towards a washing station (not shown), with no possibility for the environment to be contaminated by the traces of incoherent material present in the tubular sack 8 itself; the tubular sack 8 housed inside the spacer element 11 is perfectly closed inferiorly, and the disk-shaped screen 31, perfectly clean in correspondence with its surface previously facing the disk-shaped element 28, separates the upper inlet of the tubular sack 8 itself from the surrounding environment.

Similarly, the container 2, whose outlet is delimited by the disk-shaped element 28 which, thanks to its previous close contact with the disk-shaped screen 31, presents its own lower surface perfectly clean, can be removed to be taken towards a washing station with no possibility of contamination to the surrounding environment by the traces of incoherent material present therein.

According to the preferred embodiment, illustrated in FIGS. 15, 16, 17, 18 and 19, during the feeding of the incoherent material the valve 5 presents its shutter 21 positioned vertically relative to the conduit 7 in such a way as to leave its outflow port open and the material itself, passing along the conduit 7 dirties the outer walls of the element 28 and of the screen 31 not being able to dirty the related surfaces 29 and 33 which are in mutual contact, attracted by the magnets 57 and 58. Once the off-loading phase is complete, the shutter 21 moves to its position wherein it closes the outflow port of the conduit 7 and the extremity 7a thereof is moved away from the valve 5. At this point the resultant axial attraction force is lesser than the lateral force and the screen 31 is detached from the element 28 remaining in closure of the conduit 7 with its uncontaminated surface 33 and, similarly, the surface 29 of the element 28.

Figure 20:
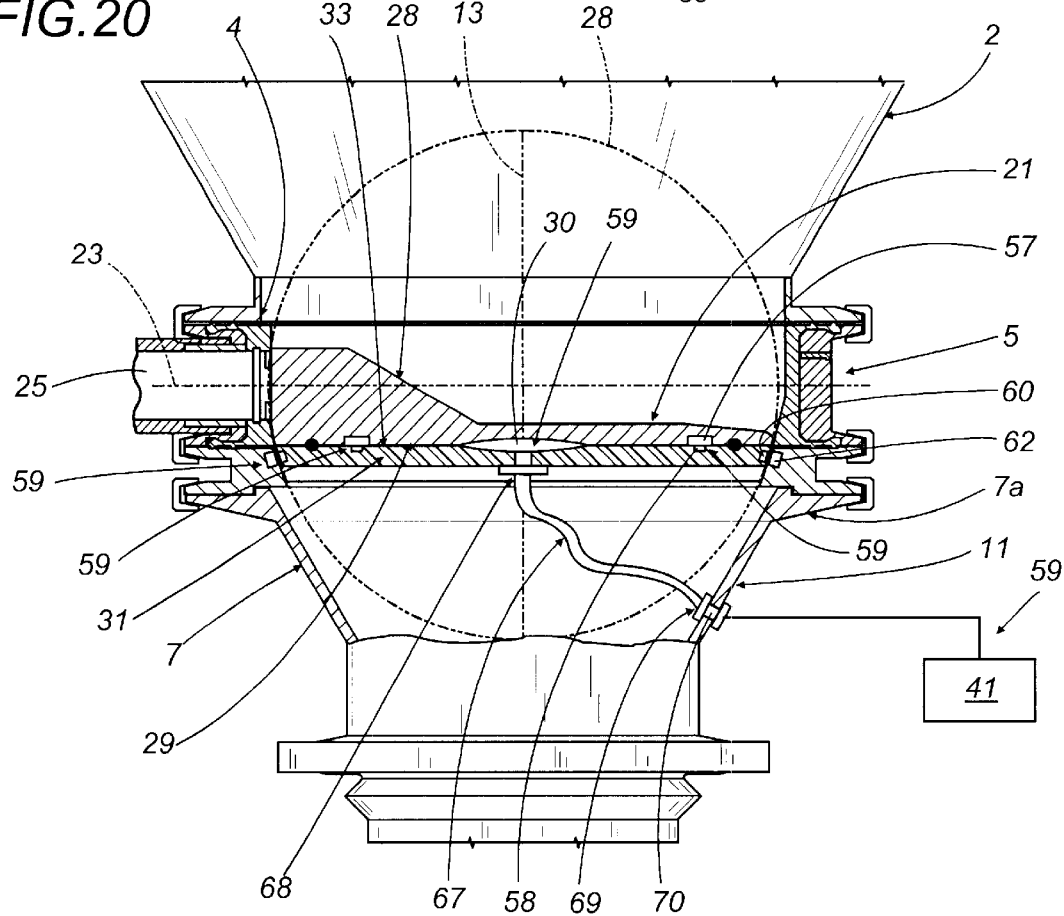
FIG. 20 shows a schematic section view of an alternative embodiment of the detail of FIGS. 16, 17, 18.

In the embodiment illustrated in FIG. 20, the aforesaid connecting means 59 provide for the simultaneous presence both of said magnetic connection means 56, and of said first suction source 41. In other words, the disk-shaped element 28 and the screen 31 are maintained associated, in the ways described above by means of the first magnets 57 and the second magnets 58, as well as of the suction source 41 which is connected to the cavity 30, obtained and interposed between the element 28 and the screen 31 by means of a flexible hose 67 which is positioned inside the container 7 and whose first extremity 68 is connected to the screen 31 and ends inside the cavity 30, and whose second extremity 69 is connected to a sleeve 70 which traverses the inner wall of the conduit 7 in proximity to its extremity 7a and communicates with the suction source 41.

The hose 67 has such a length as to allow the rotation of the shutter organ 21 during its operation.

Figure 21:
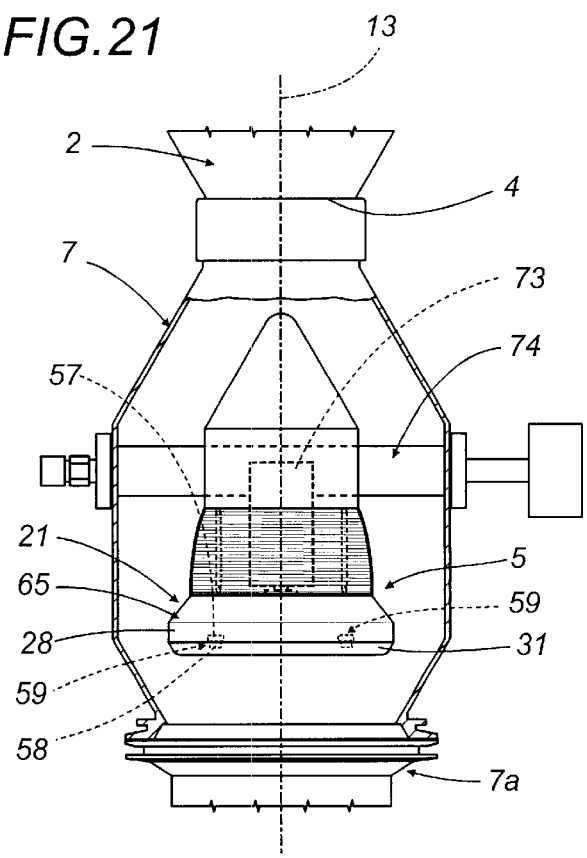
FIGS. 21 and 22 provide a schematic section view of an additional embodiment of the detail of FIG. 16 in two different operative phases.
Figure 22:
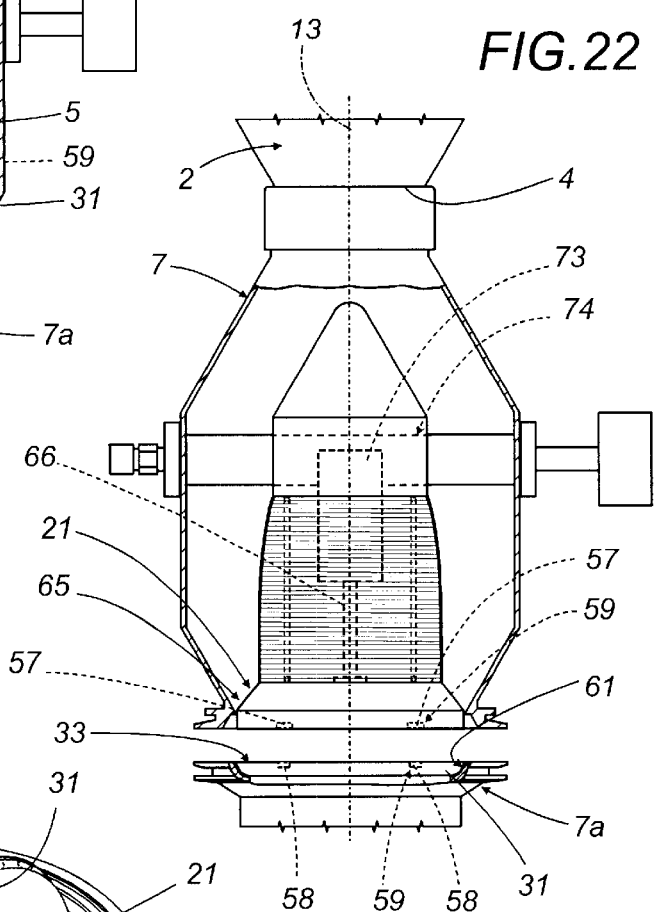

Lastly, in the embodiment illustrated in FIGS. 21 and 22 the valve organ 5 comprises a mushroom-shaped shutter 65 which lies on a plane substantially transverse to the axis 13 of the conduit 7 and is sustained by an actuating stem 66 whose axis is parallel to the axis 13, which stem is commanded by a respective piston 73. The mushroom shaped shutter 65 presents the first closure element 28 connected to the stem 66 and the second closure element 31 can be associated in a releasable manner to the first closure element 28 through the aforementioned connecting means 59 in the same ways described and illustrated for the other embodiments. In particular the mushroom-shaped shutter 65 is movable, under the action of the piston 73 sustained by a structure 74 transverse to the conduit 7, along the axis 13 between a position wherein the outflow port of the conduit 7 is open, as shown in FIG. 21, and a position wherein it is closed, as shown in FIG. 22 wherein the screen 31 is detached from the element 28 and closes the conduit 7 during its detachment from the valve element 5.

From the above description, it is apparent that the apparatus 1 fully attains its aim. Thanks to the conformation of the butterfly valve 5, the spacer element 11 and the container 2 can be removed from the apparatus 1, to be taken to a washing station, without there being any possibility that residues of incoherent materials be released therefrom.

According to the embodiments illustrated in FIGS. 23, 24, 25 and 26, the valve organ 5 does not differ from the description provided for the embodiments illustrated in FIGS. 15, 16, 17, 18 and 19, whilst the apparatus 1 comprises a cleaning organ 75 which, as shown in FIGS. 23 and 25, can be positioned, coaxially to the aforementioned axis 13, between the surface 29 of the disk-shaped element 28 and the surface 33 of the screen 31 during the separation of the first extremity 7a of the conduit 7 from the valve organ 5. During this separation, as described above and as shown in FIG. 18, the screen 31 detaches from the disk-shaped element 28 and remains integral with the extremity 7a of the conduit 7 closing it hermetically, whilst the disk-shaped element 28 remains connected to the valve body 5 to close the outlet 4 of the container 2.

The cleaning organ 75 comprises a disk-shaped body 76 whose axis is parallel to the axis 13 and whose diameter is substantially equal to the diameter of the valve body 5, and presents a first upper face 77 and a second lower face 78, mutually parallel.

Figure 24:
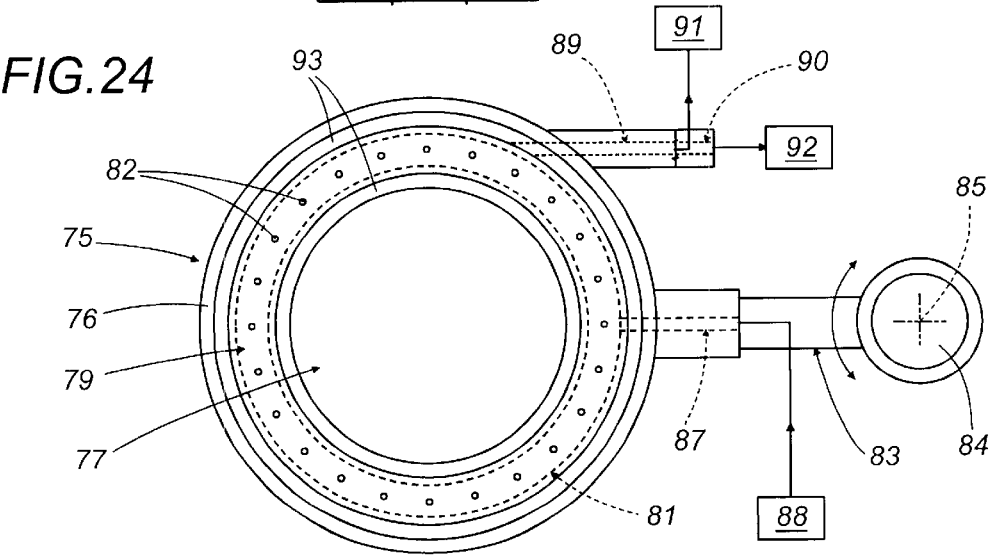
FIG. 24 shows a schematic plan view of a detail of FIG. 23.

According to the embodiment illustrated in FIGS. 23 and 24, on the first face 77 is obtained a first annular slit 79 and on the second face 78 is obtained a second annular slit 80 which are mutually parallel and coaxial. Inside the disk-shaped body 76 is obtained an annular seat 81 interposed between the two slits 79 and 80 and parallel and coaxial thereto. The annular seat 81 is connected bilaterally and through a plurality of through holes 82, uniformly distributed along its circular development, and able to place in communication the annular seat 81 itself with the bottom of the two slits 79 and 80, According to the embodiments illustrated in FIGS. 23, 24, 25 and 26, the aforementioned cleaning organ 75 is sustained by an arm 83, one of whose extremities is keyed onto a shaft 84 having axis 85 parallel to the axis 13 and motorized by respective known motor means, shown schematically with a block 86, which allow the shaft 84 to rotate in a direction and in the opposite one about the axis 85 in order to move, through the arm 83, the cleaning organ 75 from a non-operative position (not shown herein) removed from the valve organ 5 to an operative position wherein the organ 75 itself is placed between the surface 29 of the disk-shaped element 28 and the surface 33 of the screen 31, one the aforesaid separation of the first extremity 7a of the conduit 7 from the organ 5 itself has taken place.

According to the embodiment illustrated in FIGS. 23 and 24, the seat 81 is connected through a radial conduit 87 to a source of pressurized fluid, schematically represented by a block 88, whilst the two slits 79 and 80 are connected, through respective conduits 89, 90 to respective collecting containers 91 and 92.

In use, once the organ 75 is placed in the position shown in FIG. 23, the first extremity 7a of the conduit 7 and the valve organ 5 are approached until bringing the surface 29 of the disk shaped element 28 in contact with the face 77 of the cleaning organ 75 and, respectively, the surface 33 of the screen 31 in contact with the face 78 of the organ 75 itself.

Once mutual contact is reached, the slit 79 opposes and delimits in air tight fashion, by means of respective gaskets 93 provided around the slit 79 itself, the peripheral area 94 of the valve 5 which comprises an annular portion of the surface 29 of the disk-shaped closure element 28 adjacent to the peripheral edge of the disk-shaped element 28 itself and the annular portion of the valve body 5 adjacent to the edge 28a itself of the disk-shaped closure element 28. Similarly, the slit 80 opposes and delimits in air tight fashion, by means of respective gaskets 95 provided around the slit 80 itself, the peripheral area 96 of the extremity 7a of the conduit 7 which in turn comprises an annular portion of the surface 33 of the screen 31 adjacent to its peripheral edge 61 and the annular portion of the extremity 7a of the conduit 7 adjacent to the edge 61 of the screen 31.

At this point the source 88 is activated and the pressurized fluid reaches, through the seat 81, which serves as a manifold, and the respective holes 82, both slits 79 and 80 and laps the respective aforesaid peripheral areas 94, 96 under pressure, removing any residues of incoherent material present therein following the off-loading phase, driving them into the interior of the respective containers 91 and 92.

Figure 26:
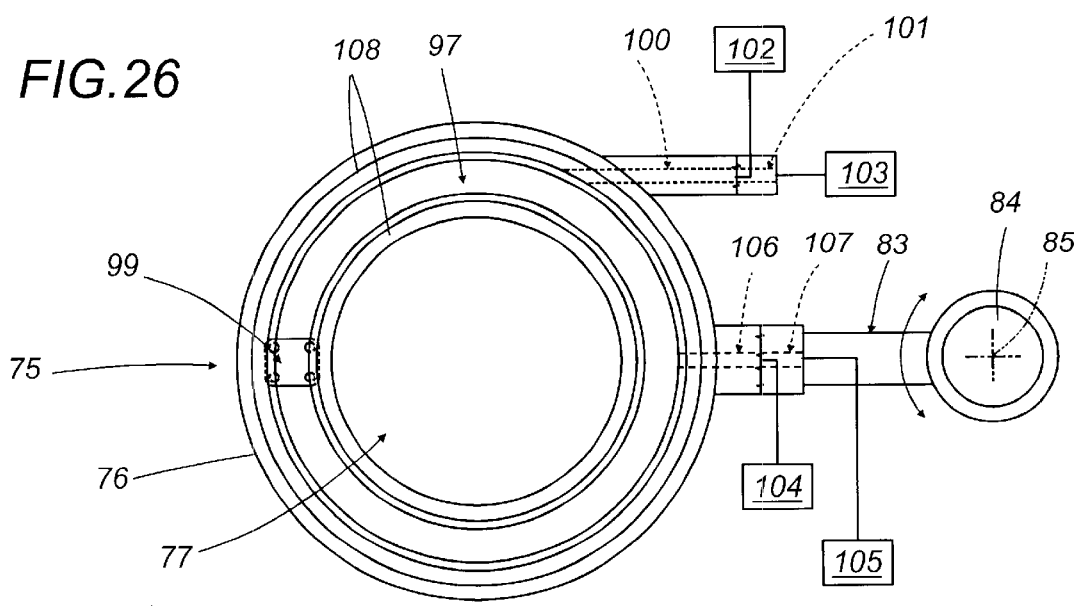
FIG. 26 shows a schematic plan view of a detail of FIG. 25.

According to the embodiment shown in FIGS. 25 and 26 on the first face 77 is obtained a first annular slit 97 and on the second face 78 is obtained a second annular slit 98 which are mutually parallel and coaxial.

Inside each slit 97 and 98 is positioned a respective brush 99 which can freely slide within the respective slits 97, 98, each of which is connected to a respective conduit 100, 101 for the delivery of a pressurized fluid coming from respective sources 102 and 103 whereto are connected the aforementioned conduits 100, 101. The pressurized fluid slows along the slits 97 and 98 and also serves as a means of propulsion for the brushes 99. The fluid is collected by respective containers 104 and 105, schematically shown in FIG. 26 and connected to the respective slits 97 and 98 by means of conduits 106 and 107.

In use, similarly to the case shown in FIGS. 23 and 24, when the slits 97 and 98 respectively oppose and delimit in air tight fashion, by means of respective gaskets 108 and 109 provided around the slits 97 and 98 themselves, the aforementioned peripheral areas 94 and 96, the brushes 99, sliding along the respective slits 97 and 98, allow a perfect cleaning action on the aforesaid peripheral areas 94 and 96 and the pressurized fluid collects any incoherent material which may be present along the areas 94 and 96 themselves which is collected in the respective containers 104 and 105.

According to an embodiment not illustrated herein of the butterfly valve 5, the disk-shaped 31 could be made integral to the disk-shaped element 28, whenever such a fact should be found necessary in accordance with the above description, thanks to the action of magnets and ferromagnetic material supported either by the disk-shaped element 28 or by the screen 31.

What is claimed is:

1. Apparatus for off-loading incoherent material from a container, for dispensing the incoherent material itself along a determined feeding route and towards a user unit, comprising a valve organ positioned in correspondence with an outlet of said container and a conduit having an axis, a first and a second extremity; the axis developing parallel to said route; the first extremity being releasably associated to said valve organ and the second extremity being connectable with said user unit; said valve organ comprising a shutter element, movable between an extreme position of air tight closure and one of opening of the outflow port of said feeding conduit, and provided with a first closure element and with a second closure element and actuator means directly connected to said first closure element; the second closure element being removably positionable on the first extremity of the conduit; said valve organ further comprising connecting means able to associate mutually and in releasable manner said first closure element and second closure element making said first closure element and said second closure element mutually adherent along a plane of substantial mutual tangency and of mutual detachment.

2. Apparatus according to claim 1, wherein said connecting means allow to maintain mutually associated said first and second closure element during the actuation of said shutter element, and allow a mutual detachment of said first and second closure element during the separation of said first extremity of said conduit from said valve organ in such a way that the first closure element is positioned to close the outlet of the container and the second closure element is positioned to close said first extremity of said conduit.

3. Apparatus according to claim 1, wherein said connecting means comprise magnetic connection means.

4. Apparatus according to claim 3, wherein said magnetic connection means comprise a plurality of first permanent magnets positioned on at least a portion of a first surface of said first closure element facing a first surface of said second closure element and on at least a portion whereof a plurality of second permanent magnets are provided, facing said first permanent magnets provided on said portion of the first surface of said first closure element.

5. Apparatus according to claim 3, wherein said magnetic connection means further comprise a plurality of third permanent magnets positioned along at least a portion of a peripheral edge of said second closure element and a plurality of fourth permanent magnets positioned along at least a portion of an inner peripheral edge of said first extremity of the conduit destined to be associated in air tight fashion with said peripheral edge of said second closure element and opposite to said third permanent magnets.

6. Apparatus according to claim 4, wherein said first and second permanent magnets generate a first determined resultant axial attraction force between said first and second closure element and said third and fourth permanent magnets generate a second determined resultant lateral attraction force between said second closure element and said first extremity of the conduit; said first and second resultant attraction forces being mutually balanced in such a way that, during said actuation of said shutter element, said first resultant axial attraction force is predominant relative to said second resultant lateral attraction force allowing to maintain mutually associated said first and second closure element, whilst during the separation of said first extremity of said conduit from said valve organ, said second resultant lateral attraction force is predominant relative to said first resultant axial attraction force allowing said second closure element to be detached from said first closure element and to remain integral with the extremity of the conduit.

7. Apparatus according to claim 1, wherein said connecting means comprise electromagnetic connection means.

8. Apparatus according to claim 1, wherein said connecting means comprise a first suction source connected to a cavity obtained and interposed between said first and second closure elements; said first suction source being able to be activated, in use, to reduce the pressure of the air housed within said cavity below atmospheric pressure and to determine a consequent stable mutual adhesion of said first and second closure elements themselves.

9. Apparatus according to claim 8, wherein, in use, on completion of the dispensing of the incoherent material from said container and after the separation of said first extremity of said conduit from said valve organ, said connecting means are inactive and said first and second closure elements are mutually separated; said first closure element being positioned in closure of the outlet of said container and said second closure element being positioned in closure of the extremity of the conduit.

10. Apparatus according to claim 1, wherein said connecting means provide for the simultaneous presence both of a magnetic connection means and of a first suction source leading to a cavity obtained and interposed between said first and second closure element.

11. Apparatus according to claim 8, comprising a flexible hose positioned within said conduit and whose first extremity is connected to one of said first and second closure element and ends inside said cavity and whose second extremity is connected to a sleeve traversing the inner wall of the conduit and communicating with said suction source.

12. Apparatus according to claim 1, wherein said valve organ comprises a butterfly valve wherein said first and second closure elements respectively comprise a disk-shaped element presenting substantially equal diameter to that of said opening of said container and a disk-shaped shield presenting substantially equal diameter to that of said disk-shaped element, said shutter element being able to pivot, in the two directions, about an axis transverse to said axis of said conduit between a closure position wherein said disk-shaped element lies on a plane transverse to said axis and an open position wherein said disk-shaped element itself lies on a plane substantially parallel to said axis.

13. Apparatus according to claim 12, wherein a portion of said valve organ is supported by a pivot and by a shaft integral thereto and connected to respective opposite bands of the valve organ itself.

14. Apparatus according to claim 13, wherein said shaft is internally traversed, at least partially by a first hole communicating both with said first suction source and with said cavity.

15. Apparatus according to claim 12, wherein a portion of said valve element is supported in overhang by a single shaft integral therewith.

16. Apparatus according to claim 15, wherein said shaft is internally traversed, at least partially, by a hole communicating both with said first suction source and with said cavity.

17. Apparatus according to claim 13, wherein said portion of said valve element comprises said disk-shaped element.

18. Apparatus according to claim 1, wherein said shutter element of said valve organ comprises a mushroom-shaped shutter lying on a plane substantially transverse to said axis of said conduit and supported by an actuating stem whose axis is parallel to the axis of said conduit, said mushroom shaped shutter presenting said first closure element connected to said stem and the second closure element being able to be associated in a releasable manner to said first closure element through said connecting means; said mushroom shaped shutter being movable under the action of respective actuating means along said axis of said stem between a closure position and an opening position of the outflow port of said conduit.

19. Apparatus according to claim 1, comprising a cleaning organ able to be positioned, coaxially to the aforementioned axis, between the surface of the first closure element and the surface of the second closure element following the separation of the first extremity of the conduit from the valve organ.

20. Apparatus according to claim 19, wherein said cleaning organ comprises a disk-shaped body presenting a first face and a second face, mutually parallel; on the first face being obtained a first annular slit and on the second face being obtained a second annular slit, inside the disk shaped body being obtained an annular seat interposed between the two slits and connected thereto by means of a plurality of through holes able to place in communication the annular seat itself with the bottom of the two slits; the seat being connected to a source of pressurized fluid and the two slits being connected to respective collection containers.

21. Apparatus according to claim 19, wherein said cleaning organ comprises a disk-shaped body presenting a first face and a second face, mutually parallel; on the first face being obtained a first annular slit and on the second face being obtained a second annular slit; inside each slit being positioned a respective brush able freely to slide inside the respective slits, each of which is connected to a respective conduit for the delivery of a pressurized fluid coming from respective sources, said pressurized fluid serving as a propulsion means for the brushes and able to be collected by respective containers connected to the respective slits by means of conduits.

22. Apparatus according to claim 19, wherein said slits are able to lap a peripheral area of the valve which comprises an annular portion of the surface of the disk-shaped closure element adjacent to the peripheral edge of the disk-shaped element itself and an annular portion of the valve body adjacent to the edge of the disk-shaped closure element and, respectively, a peripheral area of the extremity of the conduit which in turn comprises an annular portion of the surface of the second closure element adjacent to its peripheral edge and the annular portion of the extremity of the conduit adjacent to the edge of the second closure element.

23. Apparatus according to claim 1, wherein said conduit is able to house longitudinally in its interior a tubular sack whose first extremity can be placed in communication with an outlet of said container and whose second extremity can be placed in communication with said user unit; said conduit present a hollow spacer element defining said first extremity of said conduit itself and able to be associated to said valve organ, said spacer element being able to house in its interior said tubular sack collected in resting position.

24. Apparatus according to claim 23, wherein said shaft is internally traversed by a second hole; a second suction source being provided, communicating, through the second hole itself and through a filter, with an internal cavity of said spacer element able to house longitudinally in its interior said tubular sack in resting position.

25. Apparatus according to claim 23, wherein said tubular sack can be associated in a superior extremity to said outlet, and in an inferior extremity presents a junction flange or plug able to be associated to means for connecting to said user unit; means being provided for the bidirectional translation of said junction flange or plug along said conduit, able to make said extended tubular sack move to an operative position and to transfer said junction flange or plug, once it reaches a lower level, externally to the conduit itself thereby allowing the connection between the tubular sack itself and said connecting means.

26. Apparatus according to claim 23, wherein said bidirectional translator means comprise a plunger able to slide within said conduit and means able to generate a vacuum and acting on the plunger itself and on said junction flange or plug thereby fastening them upon command.

27. Apparatus according to claim 25, comprising actuating means for said plunger, positioned and acting in correspondence with the longitudinal development of said conduit and able bi-directionally to move the plunger itself.

28. Apparatus according to claim 24, wherein said translator means are able, in use, to position said plunger between two limit positions whereof a first position corresponds to a positioning of the plunger itself within said conduit, in correspondence with the inferior extremity thereof, and a second position corresponds to a positioning of said plunger external to said conduit and is situated inferiorly to said first position.

29. Apparatus according to claim 24, wherein said translator means comprise a pneumatic cylinder included in said actuating means and acting on said plunger.

30. Apparatus according to claim 24, comprising reversible means for fastening said tubular sack to a superior portion of said junction flange or plug, as well as means for closing the tubular sack itself, positioned upstream of said reversible fastening means and able to be activated independently therefrom in order to allow the association and disassociation between the tubular sack and said junction flange or plug in correspondence with an activation of said closure means, in a condition wherein said tubular sack is closed.

31. An apparatus for off-loading incoherent material, said apparatus comprising:

a conduit having an axis, a first extremity and a second extremity, said second extremity of said conduit being adapted for connection to an associated user unit;

valve means for controlling flow of incoherent material from an outlet of an associated container, said valve means comprising: (i) a first closure element movable between a closed position and an opened position, said first closure element blocking the outlet of the associated container when in said closed position and opening the outlet of the associated container when in said opened position; (ii) a second closure element removably located in blocking relation with said first extremity of said conduit, and, (iii) means for selectively releasably connecting said first closure element and second closure element whereby said second closure element moves with said first closure element and is removed from said first extremity of said conduit so as to open said first extremity of said conduit when said first closure element moves from said closed position to said opened position.

\* \* \* \* \*